(12) United States Patent
Hattori et al.

(10) Patent No.: US 7,814,741 B2
(45) Date of Patent: Oct. 19, 2010

(54) GLASS FIBER FOR REINFORCING RUBBER PRODUCTS AND METHOD FOR PRODUCING IT

(75) Inventors: Koji Hattori, Tokyo (JP); Kimihiro Ando, Tokyo (JP)

(73) Assignee: OCV Intellectual Capital, LLC, Toledo, OH (US)

( * ) Notice: Subject to any disclaimer, the term of this patent is extended or adjusted under 35 U.S.C. 154(b) by 139 days.

(21) Appl. No.: 12/097,223

(22) PCT Filed: Dec. 12, 2006

(86) PCT No.: PCT/JP2006/324754

§ 371 (c)(1), (2), (4) Date: Aug. 13, 2008

(87) PCT Pub. No.: WO2007/069602

PCT Pub. Date: Jun. 21, 2007

(65) Prior Publication Data

US 2009/0087657 A1  Apr. 2, 2009

(30) Foreign Application Priority Data

Dec. 13, 2005  (JP) .............................. 2005-358718

(51) Int. Cl.
*D02G 3/18* (2006.01)
(52) U.S. Cl. .......................................... 57/240; 57/241
(58) Field of Classification Search ............. 57/240, 57/241
See application file for complete search history.

(56) References Cited

U.S. PATENT DOCUMENTS

| | | | | |
|---|---|---|---|---|
| 3,793,130 A | * | 2/1974 | Marzocchi | ................. 442/173 |
| 3,900,661 A | * | 8/1975 | McCombs | ............... 428/296.4 |
| 6,959,534 B2 | * | 11/2005 | Westgate et al. | .............. 57/237 |
| 7,254,934 B2 | * | 8/2007 | Wu | ............................ 57/241 |
| 2002/0176986 A1 | * | 11/2002 | Watanabe et al. | ........... 428/375 |
| 2004/0033356 A1 | * | 2/2004 | Ando et al. | ................. 428/375 |
| 2005/0003186 A1 | * | 1/2005 | Ando | ........................ 428/375 |
| 2005/0129943 A1 | * | 6/2005 | Ando | ........................ 428/375 |
| 2006/0207706 A1 | * | 9/2006 | Kwon et al. | ................ 152/451 |

FOREIGN PATENT DOCUMENTS

| | | |
|---|---|---|
| EP | 0 931 774 A1 | 7/1999 |
| JP | 1-111848 U | 7/1989 |
| JP | 03-269177 A | 11/1991 |
| JP | 07-190149 A | 7/1995 |
| JP | 09-025141 A | 1/1997 |
| JP | 11-158744 A | 6/1999 |
| JP | 11-217739 A | 8/1999 |
| JP | 2001-114906 A | 4/2001 |

* cited by examiner

*Primary Examiner*—Shaun R Hurley
(74) *Attorney, Agent, or Firm*—Sughrue Mion, PLLC

(57) ABSTRACT

A glass fiber for reinforcing rubber products, which is obtained by subjecting to plying at least two twisted yarns each obtained by subjecting to twisting a coated glass fiber strand having a coating layer formed by impregnation and solidification of a RFL treating agent, the coated glass fiber strand having the coating layer formed by impregnating the RFL treating agent to an individual glass fiber strand having from 200 to 2,000 bundled glass filaments, and solidifying the impregnated agent.

8 Claims, No Drawings

GLASS FIBER FOR REINFORCING RUBBER PRODUCTS AND METHOD FOR PRODUCING IT

TECHNICAL FIELD

The present invention relates to a glass fiber for reinforcing rubber products, which is to be used as a reinforcing material for various rubber products such as rubber tires or rubber belts including timing belts; and a process for producing such a glass fiber.

BACKGROUND ART

It is common that a reinforcing glass fiber to be used to increase the strength or durability of various rubber products such as rubber tires or rubber belts including timing belts, is coated with a membrane formed by a rubber type treating agent in order to increase the adhesion between the glass fiber and a rubber base material in a rubber product and in order to increase the durability of the rubber product by protecting the glass fiber itself. As such a rubber type treating agent, a water-soluble treating agent comprising a condensate of resorcinol with formaldehyde, and a rubber latex, as the main components (hereinafter sometimes referred to as "RFL treating agent"), or a treating agent having a rubber composition dissolved in a solvent (hereinafter sometimes referred to as "rubber cement"), is known.

Further, the above glass fiber for reinforcing rubber products is commonly produced by a producing method which includes the following processes (A) to (C).

(A) A process of drawing together some of glass fiber strands obtained by bundling many glass filaments while applying a sizing agent thereto, followed by drying, and impregnating an RFL treating agent thereto, and then, solidifying the RFL treating agent impregnated to the glass fiber strands, to form a coating layer thereby to obtain a coated glass fiber.

(B) A process of subjecting the coated glass fiber to twisting to form a twisted yarn.

(C) A process of putting at least two twisted yarns together to form a plied yarn.

Further, in order to increase the adhesion between a reinforcing glass fiber and a rubber base material in a rubber product, it is common to further include the following process (D) in addition to the above processes (A) to (C).

(D) A process of coating a rubber cement on the surface of the plied yarn, and then, solidifying the rubber cement applied on the plied yarn to form a coating layer.

Here, the glass fiber strand used in the above process (A), is one prepared by bundling from 200 to 2,000 glass filaments having a diameter of from 3 to 10 μm. Further, it has been common to draw a plurality of such glass fiber strands together and to impregnate an RFL treating agent thereto.

That is, in the following Patent Document 1, it is disclosed that a high-strength glass strand prepared by bundling from 200 to 2,000 high-strength glass filaments having a diameter of more than 8 μm and at most 10 μm, is used, and 1 to 10 such high-strength glass fiber strands are drawn together and are continuously introduced into the RFL treating agent and impregnated therewith.

Further, in the following Patent Document 2, it is disclosed that a high-strength glass fiber strand prepared by bundling from 200 to 2,000, preferably from 300 to 600, high-strength glass filaments having a diameter of from 3 to 6 μm, is used, and from 1 to 10, preferably from 1 to 6, such high-strength glass fiber strands are drawn together to form a primary yarn of a specific yarn count, composed of from 200 to 5,000, preferably from 800 to 2,000, high-strength glass filaments, whereby a coated layer made of the RFL treating agent is formed on the surface of the primary yarn.

Further, in the following Patent Document 3, it is disclosed that a high-strength glass fiber strand prepared by bundling from 500 to 800 high-strength glass filaments having a diameter of from 6 to 8 μm, is used, and from 1 to 8 such high-strength glass fiber strands are drawn together.

Further, the following Patent Document 4 discloses a treating method of a glass fiber wherein a strand having glass fiber filaments drawn together or a group of such strands, is immersed in a treating agent, and then, it is passed through at least one die to squeeze and impregnate the treating agent. Further, the excess treating agent on the surface of the above glass fiber is removed by at least one pair of rollers.

Patent Document 1: JP-A-11-217739
Patent Document 2: JP-A-11-158744
Patent Document 3: JP-U-1-111848
Patent Document 4: JP-A-9-25141

DISCLOSURE OF THE INVENTION

Problems to be Solved by the Invention

As mentioned in examples of each of the above Patent Documents, in a conventional process for producing a glass fiber for reinforcing rubber products, it has been common for obtaining a coated glass fiber that 3 or more glass fiber strands each having bundled from 200 to 400 glass filaments having a specific average diameter, are drawn together, and the RFL treating agent is impregnated to them, followed by solidification of the RFL treating agent.

However, by such a common process, when the plurality of glass fiber strands are drawn together and are continuously introduced to a bath filled with the RFL treating agent, to impregnate the RFL treating agent to the glass fiber strands, surrounding air is likely to be included among the glass fiber strands, so that impregnation of the RFL treating agent to the glass fiber strands becomes insufficient because of the presence of such included air, and the physical performance of the finally obtainable glass fiber for reinforcing rubber products may sometimes be adversely affected.

Further, if the impregnation of the RFL treating agent to the glass fiber strands is insufficient, the RFL treating agent which is not completely impregnated, will remain on the surface of the glass fiber strands, so that some portions will have an excess RFL treating agent, whereby when the RFL treating agent is dried and solidified to form a coating layer, the excess RFL treating agent may sometimes be blistered to form a scab-form membrane. Such blistered membrane will be peeled by friction between the coated glass fiber and a guide or traveler, whereby a working environment will be deteriorated, or the appearance of the obtainable glass fiber for reinforcing rubber products, will be impaired.

A glass strand is usually wound up in a form of a drum into a coiled body called a cake, and the glass stand is used by being pulled out from such a cake. When the cake is heated to dry, the sizing agent applied to the glass strand will move to an inner section (towards the center of the coiled body) and an outer section of the cake, along with evaporation of moisture, whereby there will be a phenomenon (commonly called as migration) such that a large amount of the sizing agent is unevenly distributed at such sections of the glass fiber strand. The glass fiber strand having a large amount of the sizing agent at such sections, is relatively poor in impregnation of the RFL treating agent, so that the above problem which happens when impregnation is insufficient, tends to be more distinct. Therefore, a certain amount of the glass fiber strand at the innermost section and the outermost section of the cake, having a large amount of the sizing agent deposited, is required to be removed and disposed, thus leading to a decrease of the yield.

Further, in the above process (A), when some glass fiber strands are drawn together, and the RFL treating agent is impregnated to them, a tension compensator such as a disk tenser is used to draw the respective glass fiber strands together with uniform tension. In such a case, if a load applied by the disk tenser is too large, the glass fiber strands will be damaged, and therefore the load has to be made as small as possible. As a result, it is difficult to draw the respective glass fiber strands together with uniform tension, and tension will be unevenly distributed. Such uneven distribution of tension may sometimes adversely affect the physical performance, particularly the tensile strength, of the finally obtainable glass fiber for reinforcing rubber products.

Therefore, the object of the present invention is to provide a glass fiber for reinforcing rubber products, having excellent appearance and a physical performance, and having little fluctuation of quality, wherein an RFL treating agent is uniformly and sufficiently impregnated to the glass fiber strand, and an excess RFL treating agent is prevented from remaining on and being peeled off from the surface of the glass fiber strand; and a process for producing such a glass fiber.

Means to Solve the Problems

In order to accomplish the above object, the glass fiber for reinforcing rubber products of the present invention, is a glass fiber for reinforcing rubber products, which is obtained by subjecting to plying at least two twisted yarns each obtained by subjecting to twisting a coated glass fiber having a coating layer formed by impregnation and solidification of a RFL treating agent comprising, as the main components, a rubber latex and a water-soluble condensate of resorcinol with formaldehyde, wherein the coated glass fiber is a coated glass fiber having the coating layer formed by impregnating the RFL treating agent to a single glass fiber strand having from 200 to 2,000 glass filaments bundled, and solidifying the impregnated agent.

According to the glass fiber for reinforcing rubber products of the present invention, the RFL treating agent is impregnated to one glass fiber strand having from 200 to 2,000 glass filaments bundled, and solidified to form a coating layer, whereby air is not included during the impregnation of the RFL treating agent to the glass fiber strand, and the RFL treating agent is uniformly and sufficiently impregnated among the respective filaments forming the glass fiber strand. Therefore, such a glass fiber for reinforcing rubber products will be free from such a possibility that a blistered membrane formed by an excess RFL treating agent, will remain and be peeled off, and it will have excellent appearance and physical performance, particularly excellent tensile strength.

The glass fiber for reinforcing rubber products of the present invention, is preferably such that a coating layer of a treating agent comprising a rubber and a solvent, is further formed on the surface of the above glass fiber obtained by the plying. It is thereby possible to increase its adhesion with a rubber base material in a rubber product.

Further, in the glass fiber for reinforcing rubber products of the present invention, the above glass fiber strand is preferably a glass fiber strand having from 500 to 1,500 glass filaments bundled. It is thereby possible to have excellent impregnation of the RFL treating agent to the glass fiber strand while maintaining excellent productivity of the glass fiber strand in a fiber forming process.

Further, with respect to the glass fiber for reinforcing rubber products of the present invention, the yarn count (g/km) and the cross section (mm$^2$) preferably satisfy the relation of the following formula (1), more preferably satisfy the relation of the following formula (2):

$$1450 \leq \text{yarn count(g/km)/cross section(mm}^2\text{)} \leq 1900 \quad (1)$$

$$1550 \leq \text{yarn count(g/km)/cross section(mm}^2\text{)} \leq 1800 \quad (2)$$

On the other hand, the method for producing a glass fiber for reinforcing rubber products of the present invention, comprises an impregnation process (A) of impregnating a RFL treating agent comprising, as the main components, a rubber latex and a water-soluble condensate of resorcinol with formaldehyde, to a glass fiber strand, and solidifying the RFL treating agent impregnated to the glass fiber strand to form a coating layer thereby to obtain a coated glass fiber, a twisting process (B) of subjecting the coated glass fiber to twisting to obtain a twisted yarn, and a plying process (C) of putting at least two such twisted yarns together and subjecting them to plying, wherein in the impregnation process (A), as the glass fiber strand, one having from 200 to 2,000 glass filaments bundled, is used, and the RFL treating agent is impregnated to each glass fiber strand independently without drawing such glass fiber strands together.

According to the method for producing a glass fiber for reinforcing rubber products of the present invention, without drawing together a plurality of glass fiber strands having a specific number of glass filaments bundled, the above RFL treating agent is impregnated to each glass fiber strand independently, whereby air is hardly included during the impregnation of the RFL treating agent, and the impregnation state of the RFL treating agent to the glass strand is good. As a result, there will be no such a possibility that a blistered membrane by an excess RFL treating agent, will remain and be peeled off, and an obtainable glass fiber for reinforcing rubber products will have excellent appearance and physical performance. Moreover, it is possible to prevent deterioration of the working environment in the twisting process. Further, in the present invention, a plurality of glass fiber strands are not drawn together for the impregnation of the RFL treating agent, and tension among the glass fiber strands will not be unequal, whereby it is possible to provide excellent strength, particularly a tensile strength, of an obtainable glass fiber for reinforcing rubber products, thus to improve the quality.

The process for producing a glass fiber for reinforcing rubber products of the present invention, preferably further includes an over-coating process (D) of applying a treating agent comprising a rubber and a solvent on the surface of the plied yarn obtained by the above plying process (C), and then, the treating agent applied on the plied yarn is solidified to form a coating layer. It is thereby possible to increase the adhesion with a rubber base material in a rubber product.

Further, in the method for producing a glass fiber for reinforcing rubber products of the present invention, it is preferred to use, as the above glass fiber strand, a glass fiber strand having from 500 to 1,500 glass filaments bundled. It is thereby possible to have excellent impregnation of the RFL treating agent to the glass fiber strand while maintaining excellent productivity of the glass fiber strand in a fiber forming process.

Effects of the Invention

According to the present invention, the impregnation of the RFL treating agent to the glass fiber strand is excellent, whereby the coating layer rarely has blister and scale, and appearance and physical performance are also excellent. Further, the strength, particularly tensile strength, of an obtainable glass fiber for reinforcing rubber products, is good and thus it is possible to improve the quality.

BEST MODE FOR CARRYING OUT THE INVENTION

The glass fiber for reinforcing rubber products of the present invention, is one obtained by subjecting to plying at least two twisted yarns of the coated glass fiber obtained by solidification of a RFL treating agent to form coating film layer, such a RFL treating agent comprises, as the main components, a rubber latex and a water-soluble condensate of resorcinol with formaldehyde, and which is impregnated to each glass fiber strand individually without drawing together a plurality of the glass fiber strands.

The glass fiber strand to be used in the present invention is a glass fiber strand having from 200 to 2,000 glass filaments bundled. Specifically, a glass fiber strand having from 500 to 1,500 glass filaments bundled, is preferred from a viewpoint such that it is possible to have excellent impregnation of the RFL treating agent to the glass fiber strand while maintaining excellent productivity of the glass fiber strand in a fiber forming process. Further, the glass fiber strand is preferably used after bundling glass filaments by applying a sizing agent comprising a silane coupling agent, a film-forming agent, etc.

The average diameter of glass filaments is preferably from 5 to 15 μm, more preferably from 7 to 9 μm. Further, the composition of glass consisting the glass filaments, is not particularly limited, and it may, for example, be E glass, S glass, etc.

The RFL treating agent to be used in the present invention is a composition comprising a rubber latex and a water-soluble condensate of resorcinol with formaldehyde (hereinafter "a water-soluble condensate of resorcinol with formaldehyde" will be referred to as "an RF condensate"), wherein an RF condensate and a rubber latex are uniformly mixed in water as a solvent in accordance with a common method.

As the RF condensate to be incorporated to the RFL treating agent, it is possible to use a water-soluble addition condensate rich in oxymethyl groups, obtained by reacting resorcinol with formaldehyde in the presence of an alkaline catalyst such as an alkali metal hydroxide, ammonia or an amine, and it is preferably an RF condensate obtained by a reaction of resorcinol:formaldehyde in a molar ratio of 1:(0.3 to 2.5).

The rubber latex to be blended for an RFL treating agent may, for example, be a latex of a vinylpyridine/styrene/butadiene terpolymer, a latex of an acrylonitrile/butadiene/styrene terpolymer, a latex of an acrylonitrile/butadiene copolymer, a latex of a modified acrylonitrile/butadiene copolymer, a latex of a styrene/butadiene copolymer, a latex of a dicarboxylated styrene/butadiene copolymer, a latex of polybutadiene, or a latex of a halogen-containing polymer. They may be used alone or in combination as a mixture of two or more of them. Among them, a combination of a latex of a vinylpyridine/styrene/butadiene terpolymer (hereinafter referred to as "a vinylpyridine latex") with other rubber latexes is preferred, and it is preferably a combination of a vinylpyridine latex with a latex of a halogen-containing polymer, from a viewpoint such that it is possible to improve the heat resistance, flex fatigue resistance or water resistance of a finally obtainable rubber product such as a timing belt, or the like. Further, a halogen-containing polymer contained in the above latex of a halogen-containing polymer, may, for example, be a chlorinated rubber, a chloroprene rubber or a chlorosulfonated polyethylene, and a chlorosulfonated polyethylene is particularly preferred. Further, as the above vinylpyridine latex, it is possible to use one commonly used for treatment of a fiber for reinforcing rubber products, and it is preferably a latex obtained from a terpolymer having a content ratio of vinylpyridine:styrene:butadiene of 10 to 20:10 to 20:60 to 80 by mass percent.

As such a vinylpyridine latex, Nipol-2518FS (tradename, manufactured by ZEON CORPORATION) or Pyratex (tradename, manufactured by NIPPON A&L INC.) may, for example, be suitably used.

The content ratio of the RF condensate and the rubber latex in the RFL treating agent, is such that based on 100 parts by mass of the rubber latex, the RF condensate is preferably from 1 to 40 parts by mass, particularly preferably from 2 to 15 parts by mass. Further, when a vinylpyridine latex is used in combination with other rubber latexes, such other rubber latexes are preferably from 5 to 100 parts by mass, particularly preferably from 10 to 30 parts by mass, based on 100 parts by mass of the vinylpyridine latex. Further, the above content ratio of the respective components is a mass ratio of their solid contents.

To the RFL treating agent, as the case requires, it is possible to incorporate a component which is commonly incorporated in a conventional RFL treating agent, in addition to the RF condensate and the rubber latex. For example, a stabilizer of a latex or an age resistor, may be mentioned. The stabilizer may, for example, be an aqueous ammonia or an aqueous solution of sodium hydroxide, and the age resistor may, for example, be a liquid type emulsified product of a mineral oil.

The solid content, namely the concentration, of the RFL treating agent is preferably from 10 to 50 mass %, more preferably from 20 to 40 mass %. If the above concentration is less than 10 mass %, the RFL treating agent may not be impregnated in a sufficient amount to the glass fiber strand. If it is beyond 50 mass %, the stability of the RFL treating agent will be decreased, and the agent will tend to be gelled.

The fiber for reinforcing rubber products of the present invention is one having a glass fiber strand coated with a coating layer (hereinafter referred to also as "the first membrane") formed by the above RFL treating agent. However, in order to further increase the adhesion with a rubber composition which will be the base material for a rubber product such as a tire or a rubber belt including a timing belt, it is preferred that the first membrane is further covered by a coating layer (hereinafter referred to also as "the second membrane") formed by the treating agent comprising a rubber and a solvent (hereinafter referred to as "the over-coat treating agent").

Such an over-coat treating agent contains a rubber, as a main component, and it can be obtained by dissolving, to a solvent, a rubber and other components which are incorporated as the case requires, in accordance with a common method.

The rubber to be used for the over-coat treating agent may be a rubber used for a conventional rubber cement such as a halogen-containing polymer, an acrylonitrile/butadiene copolymer rubber (NBR) or a hydrogenated nitrile rubber (H-NBR), etc. As the halogen-containing polymer may, for example, be a chlorinated natural rubber, a chloroprene rubber, a chlorinated polyethylene, a chlorinated ethylene/propylene copolymer, a chlorinated polyvinyl chloride, a chlorosulfonated polyethylene or a chloro-brominated polybutadiene.

As the solvent to be used for the over-coat treating agent, it is possible to use an organic solvent. It may, for example, be xylene, toluene, methyl ethyl ketone (MEK), methyl isobutyl ketone (MIBK) or ethyl acetate.

To the over-coat treating agent, as the case requires, it is possible to incorporate a curing agent, an isocyanate, a resin, an additive, etc., in addition to the above rubber and solvent.

As the above curing agent, a polynitroso aromatic compound or a benzoquinone may, for example, be used. As the polynitroso aromatic compound, p-dinitrosobenzene or poly p-dinitrosobenzene may, for example, be mentioned.

The benzoquinone may, for example, be tetrachlorobenzoquinone, p-, p'-dibenzoylbenzoquinone dioxime or p-benzoquinone dioxime. Among them, it is preferred to use poly p-dinitrosobenzene, tetrachlorobenzoquinone, p-, p'-dibenzoylbenzoquinone dioxime or p-benzoquinone dioxime.

As the above isocyanate, methylenediphenyl diisocyanate (MDI), toluene diisocyanate (TDI), triphenylmethane triisocyanate or naphthalene diisocyanate (NDI) may, for example, be used. However, an isocyanate monomer is highly volatile and is not preferred from the viewpoint of the safety and the handling efficiency. Preferred is a polyisocyanate such as a dimer, which has a relatively small molecular weight and a high reactivity, and more preferred is a polyisocyanate having a polymerization degree of from 2 to 10.

As the above resin, it is possible to use an uncured phenol resin or an uncured epoxy resin. The uncured phenol resin is an uncured one among resins obtained from a phenol and an aldehyde, namely a phenol resin having reactivity for curing, and it may, for example, be novolac or resol. Further, an uncured epoxy resin is one which is not yet cured among epoxy resins, i.e. one having reactivity for curing. The epoxy resin may, for example, be a bisphenol A type epoxy resin, a bisphenol F type epoxy resin, a phenol novolac type epoxy resin, or a cresol novolac type epoxy resin.

As the above additive, a curing accelerator, a softener, an antioxidant, an inorganic filler commonly used as an additive for a rubber composition may, for example, be used. As the inorganic filler, silica or carbon black may, for example, be used. Further, as the curing accelerator, a maleimide type curing accelerator may, for example, be used.

A preferred example of a component for the over-coat treating agent used in the present invention, may be a combination of a halogen-containing polymer, an isocyanate and a curing agent, or a combination of an acrylonitrile/butadiene copolymer rubber, an uncured phenol resin and an uncured epoxy resin.

The solid content, namely the concentration, of the over-coat treating agent is preferably from 3 to 20 mass %, more preferably from 5 to 15 mass %. If the above concentration is less than 3 mass %, the over-coat treating agent may not be applied in a sufficient amount to the glass fiber strand. If it is beyond 20 mass %, the stability of the over-coat treating agent may be deteriorated.

Further, the glass fiber for reinforcing rubber products of the present invention, may be coated with a coating layer (a third membrane) formed by a treating agent containing the same rubber as the rubber base material in a rubber product, in order to increase the adhesion with the rubber composition as the base material for a rubber product, as disclosed, for example, in JP-A-3-269177 or JP-A-7-190149.

Further, with respect to the glass fiber for reinforcing rubber products of the present invention, the yarn count (g/km) and the cross section (mm$^2$) preferably satisfy the relation of the following formula (1), more preferably satisfy the relation of the following formula (2)

$$1450 \leq \text{yarn count(g/km)/cross section(mm}^2) \leq 1900 \quad (1)$$

$$1550 \leq \text{yarn count(g/km)/cross section(mm}^2) \leq 1800 \quad (2)$$

When a value obtained by dividing the yarn count (g/km) of the glass fiber for reinforcing rubber products by the cross section (mm$^2$) of the fiber, is in the above range, the cohesion among twisted yarns constituting the glass fiber for reinforcing rubber products will be strong, so that the glass fiber for reinforcing rubber product will have excellent water durability because the penetration of water into the inside of the fiber is prevented even if the fiber is immersed in water, and the glass fiber for reinforcing rubber products will be able to maintain good flexibility. By using such a glass fiber for reinforcing rubber products, the water resistance of a finally obtainable rubber product such as a timing belt will be good.

Now, the method for producing a glass fiber for reinforcing rubber products of the present invention, will be described.

The glass fiber for reinforcing rubber products of the present invention is produced via an impregnation process (A) of impregnating an RFL treating agent to a glass fiber strand, and then, solidifying the RFL treating agent impregnated to the glass fiber strand to form a coating layer thereby to obtain a coated glass fiber, a twisting process (B) of subjecting the coated glass fiber to twisting to obtain a twisted yarn, and a plying process (C) of putting at least two such twisted yarns together and subjecting them to plying.

That is, first, in the impregnation process (A), a glass fiber strand to be coated, is continuously introduced to a bath filled with the RFL treating agent, and the RFL treating agent is adhered and impregnated to the fiber. Further, such a glass fiber strand having the RFL treating agent adhered, is continuously heated in a hot-air oven at from 200 to 350° C., followed by drying and solidifying the RFL treating agent, to form a first membrane, thereby to obtain a coated glass fiber having the first membrane.

The present invention is characterized in that in such an impregnation process, glass fiber strands are not drawn together, but each strand is independently introduced to a bath filled with the RFL treating agent, and the RFL treating agent is impregnated to it.

In such an impregnation process, if a plurality of glass fiber strands were drawn together and were introduced to a bath filled with the RFL treating agent as a conventional technique, they were introduced to the bath while surrounding air is included among the glass fiber strands, whereby the agent tended to be impregnated together with the air, and small air bubbles tended to remain in the first membrane. As a result, a blistered portion would be formed on the first membrane, and such a blistered portion would easily be peeled. Especially, with respect to the glass fiber strand taken out from the innermost or outermost section of the cake wherein migration took place, it had a large amount of the sizing agent, whereby the impregnation of the RFL treating agent was poor, and specifically, small air bubbles tended to remain, and blister and scale was like to result.

Further, the glass fiber for reinforcing rubber products obtained by such a conventional technique, would easily be poor in strength, particularly tensile strength, and it was hardly able to stabilize the product quality.

When the RFL treating agent is impregnated to glass fiber strands, uniform tension needs to be provided to draw the respective glass fiber strands together. However, if the tension is too large, the glass fiber strands will be damaged, whereby the physical performance may be deteriorated, and the fibers may be broken. Therefore, the tension needs to be as small as possible, which means that it will be difficult to provide uniform tension to the respective strands. As a result, it is considered that when the tensile stress is exerted on the glass fiber for reinforcing rubber products, the respective glass fiber strands constituting such a fiber cannot resist the stress equally.

However, according to the producing method of the present invention, glass fiber strands are not drawn together, but individually introduced to a bath filled with the RFL treating agent. By impregnating the RFL treating agent to each glass fiber strand individually, it is possible to impregnate the RFL treating agent efficiently, and small air bubbles will hardly remain in the first membrane. Further, tension at the glass fiber strand will not be non-uniform, whereby tensile strength will sufficiently be obtained. Further, it is possible to prevent fluctuation of the quality.

Further, since it is possible to have the efficient impregnation of the RFL treating agent, even in the glass fiber strand of an inner or outer section of the cake having a large amount of the sizing agent because of migration, blister and scale is hardly formed, and it is possible to improve the yield of the glass fiber strand.

Further, it is possible to reduce an installation space of a rack (creel) for the cake, whereby it is possible to reduce the size of the whole production device, and installation space and device cost will be reduced.

In the present invention, the deposited amount of the first membrane to the coated glass fiber is preferably from 12 to 25 mass %, more preferably from 16 to 22 mass %, as solid content, based on the mass of the coated glass fiber. If the deposited amount is less than 12 mass %, individual glass filaments of the coated glass fiber tend to be hardly adequately covered by the first membrane, and the glass filaments are likely to contact one another and tend to be abraded by friction, so that the bending fatigue resistant of the finally obtainable timing belts, etc., tends to be poor. If the deposited amount exceeds 25 mass %, the flexibility of the membrane tends to be poor, and also the flex fatigue resistance of the finally obtainable rubber belts, etc., tends to be poor.

Then, in the twisting process (B), coated glass fibers obtained in the above impregnation process, are individually or in combination of a plurality of them, subjected to twisting by a twisting machine such as a ring twisting machine to obtain a twisted yarn. The number of twists of the coated glass fiber in such twisting process is preferably from 0.5 to 4 twists/25 mm. Otherwise, in the present invention, the coated glass fiber obtained in the above impregnation process, may be once taken up, and then, the coated glass fiber may be subjected to twisting to obtain a twisted yarn, or the coated glass fiber obtained in the above impregnation process may be subjected to twisting without being taken up, to obtain a twisted yarn.

Then, in the plying process (C), at least two, preferably from 5 to 20 twisted yarns obtained in the above twisting process, are put together, and subjected to plying by means of a twisting machine such as a ring twisting machine or a flyer twisting machine to obtain a plied yarn. The number of twists in such a plying process is preferably from 0.5 to 4 twists/25 mm. The twisting direction in the plying process is adjusted to be opposite from the twisting direction in the twisting process.

In the present invention, after the plying process, it is preferred to carry out an over-coating process (D), wherein an over-coat treating agent is applied on the surface of the above plied yarn, and the over-coat treating agent applied on the plied yarn, is solidified to form a second membrane. By forming the second membrane, it is possible to improve the adhesion between the reinforcing glass fiber and a rubber composition as the base material for a rubber product.

The second membrane may be formed in such a manner that after the above plying process, the plied yarn is continuously immersed in a bath filled with the over-coat treating agent, or the over-coat treating agent is sprayed or coated on the surface of the plied yarn to have the over-coat treating agent applied to the plied yarn. Then, the plied yarn is continuously heated in e.g. a hot air oven at from 120 to 200° C. to dry and solidify the over-coat treating agent.

At that time, the deposited amount of the second membrane to the reinforcing glass fiber is preferably from 1 to 15 mass %, particularly preferably from 3 to 10 mass %, as solid content, based on the mass of the reinforcing glass fiber. If the deposited amount is less than 1 mass %, the effect for increasing the adhesion between the reinforcing glass fiber and the rubber composition as the base material for rubber products is likely to be inadequate. Even if the deposited amount exceeds 15 mass %, the effect for increasing the adhesion will not increase so much, and the adhesion may rather be hindered.

Further, in the present invention, it is preferred to properly select a method from the following (a) to (e) methods, to adjust the yarn count (g/km) and the cross section (mm$^2$) to satisfy the relation of the following formula (1), it is more preferred to adjust them to satisfy the relation of the following formula (2):

$$1450 \leq \text{yarn count(g/km)/cross section(mm}^2) \leq 1900 \quad (1)$$

$$1550 \leq \text{yarn count(g/km)/cross section(mm}^2) \leq 1800 \quad (2)$$

(a) By properly adjusting the incorporating amounts of the respective components, particularly the amount of a vinylpyridine latex, of the RFL treating agent to be impregnated to a glass fiber strand, proper tackiness (the degree of stickiness of a coating layer made by the RFL treating agent covering a coated glass fiber) will be provided to the coated glass fiber, and in the subsequent plying process, the coated glass fibers (the twisted yarns) will be easily bound to one another.

(b) In the impregnation process, by properly adjusting the temperature of a hot air oven to heat the glass fiber strand having the RFL treating agent impregnated thereto, proper tackiness will be provided to the coated glass fiber.

(c) In the plying process, the tension exerted on the respective plural twisted yarns to be twisted, is properly adjusted by a tension adjusting mechanism of a twisted yarn-supplying portion (commonly called creel) of the twisting machine for plying.

(d) In the plying process, when a ring twisting machine is used, the number of revolution of the take-up portion (commonly called spindle) is properly adjusted, and the weight and size of a traveler to be used are properly selected.

(e) In the plying process, when a flyer twisting machine is used, in order to arrange twisted yarns to be a core material or side material of a plied yarn, as disclosed in JP-A-2001-114906, a yarn-separating guide having small pores for individually introducing the respective twisted yarns, is used, and a plurality of twisted yarns for constituting a plied yarn are thereby separated into a core material and a side material.

EXAMPLES

Now, the present invention will be described in further detail with reference to Examples. Here, in the following respective Examples, as an RFL treating agent and an over-coating agent, ones obtained by the following processes were used.

Process for Producing RFL Treating Agent

To 100 parts by mass of a vinylpyridine latex (tradename: "Pyratex", manufactured by NIPPON A&L Inc.), 11.1 parts by mass of a latex of a chlorosulfonated polyethylene (tradename: "CSM450", manufactured by SUMITOMO SEIKA CHEMICALS CO., LTD), 6.7 parts by mass of an RF condensate (solid content: 7%) and deionized water were mixed to obtain an RFL treating agent having a concentration of 30%. Further, the above proportions of the respective components are proportions as solid contents.

Over-Coat Treating Agent

10 Parts by mass of a chlorosulfonated polyethylene (tradename: "Hypalon 40", manufactured by DuPont Dow Elastomers L.L.C.) as a halogen-containing polymer, 5 parts by mass of polyisocyanate (tradename: "MR-200", manufactured by NIPPON POLYURETHANE K.K.), 2 parts by mass of p,p'-dibenzoylbenzoquinone dioxime as a curing agent, 5 parts by mass of carbon black as an inorganic filler, and as a solvent, toluene, were mixed to obtain an over-coat treating agent having a concentration of 10%.

Example 1

600 Glass filaments made of high-strength glass (S glass) and having an average diameter of 7 μm, were bundled while applying a sizing agent containing an amino silane coupling agent as the main component, and were taken up by a winding machine, followed by drying to obtain a cake of a glass fiber strand having a mass of 3,300 g.

Then, the glass fiber strand was pulled out from the innermost section of such a cake, and 500 m each was pulled out from each of the following sections (1) to (7). The glass fiber strand pulled out from each section was individually and continuously immersed in a bath filled with the RFL treating agent to have the RFL treating agent deposited and impregnated to the glass fiber strand.

Then, such a glass fiber strand was continuously heated for one minute in a hot air oven at a temperature of 250° C. to dry and solidify the RFL treating agent, to obtain a coated glass fiber having a coating layer (first membrane) made of the RFL treating agent. Then, such a coated glass fiber was taken up by using a ring twisting machine as a winding machine. In such a manner, 7 twisted yarns having a number of twists of 2 twists/25 mm were obtained. Here, the deposited amount of the above first membrane was 18% as solid content based on the mass of the twisted yarn.

(1) The section wherein about 50 grams of the glass fiber strand was removed from the innermost section of the cake by pulling it out (remaining amount of cake: about 3,250 g).

(2) The section wherein about 150 grams of the glass fiber strand was removed from the innermost section of the cake by pulling it out (remaining amount of cake: about 3,150 g).

(3) The section wherein about 1,300 grams of the glass fiber strand was removed from the innermost section of the cake by pulling it out (remaining amount of cake: about 2,000 g).

(4) The section wherein about 2,300 grams of the glass fiber strand was removed from the innermost section of the cake by pulling it out (remaining amount of cake: about 1,000 g).

(5) The section wherein about 3,050 grams of the glass fiber strand was removed from the innermost section of the cake by pulling it out (remaining amount of cake: about 250 g).

(6) The section wherein about 3,080 grams of the glass fiber strand was removed from the innermost section of the cake by pulling it out (remaining amount of cake: about 220 g).

(7) The section wherein about 3,120 grams of the glass fiber strand was removed from the innermost section of the cake by pulling it out (remaining amount of cake: about 180 g).

Comparative Example 1

200 Glass filaments made of high-strength glass (S glass) and having an average diameter of 7 μm, were bundled while applying a sizing agent containing an amino silane coupling agent as the main component, and were taken up by a winding machine, followed by drying to obtain a cake of a glass fiber strand having a mass of 3,300 g.

Further, the glass fiber strand was pulled out from the innermost section of each of such three cakes, and 500 m each was pulled out from the same sections as in Example 1 (7 sections of (1) to (7)). Such three glass fiber strands were drawn together and continuously immersed in a bath filled with the RFL treating agent to have the RFL treating agent deposited and impregnated to the glass fiber strands.

Then, such glass fiber strands were continuously heated for one minute in a hot air oven at a temperature of 250° C. to dry and solidify the RFL treating agent, to obtain a coated glass fiber having the above first membrane.

Then, such a coated glass fiber was taken up by using a ring twisting machine as a winding machine. In such a manner, 7 twisted yarns having a number of twists of 2 twists/25 mm were obtained. Here, the deposited amount of the above first membrane was 18% as solid content based on the mass of the twisted yarn.

Test Example 1

With respect to each of the 14 twisted yarns obtained in the above Example 1 and Comparative Example 1, the yarn count and the tensile strength were measured, and a value obtained by dividing the tensile strength by the yarn count was used as an index for the physical strength. Further, with respect to each of the twisted yarns, evaluation of the impregnation degree of the RFL treating agent was carried out by the following method. The results are shown in Table 1.

Method for Measuring Tensile Strength

Using a tensile tester, the measurement of stress at break was carried out under such conditions that the chuck distance was 250 mm, and the tensile speed was 250 mm/min.

Evaluation of Impregnation Degree of RFL Treating Agent to Glass Fiber Strand 40 cm of a terminal end (winding terminal of the coil) portion of each of the twisted yarns was pulled out and was visually observed. The number of blisters or scales (scab-form membrane or their peeled portions) in the first membrane was counted, and it was converted to a number per 10 cm. Smallness of the number was used as an index for the impregnation degree of the RFL treating agent to the glass fiber strand.

TABLE 1

| | Cake | | Example 1 | | | | Comparative Example 1 | | | |
|---|---|---|---|---|---|---|---|---|---|---|
| Section used | Removed amount of strand (g) | Remaining amount of cake (g) | Yarn count (g/km) | Tensile strength (N) | Tensile strength/ yarn count | Number of blisters | Yarn count (g/km) | Tensile strength (N) | Tensile strength/ yarn count | Number of blisters |
| [1] | 50 | 3250 | 82.4 | 85.04 | 1.032 | 2 | 81.6 | 80.22 | 0.983 | 11 |
| [2] | 150 | 3150 | 82.7 | 85.15 | 1.03 | 1 | 80.5 | 79.02 | 0.982 | 7 |
| [3] | 1300 | 2000 | 78.6 | 91.79 | 1.168 | 0.5 | 80 | 87.72 | 1.097 | 0.5 |
| [4] | 2300 | 1000 | 79.2 | 89.61 | 1.131 | 0.5 | 80.7 | 86.45 | 1.071 | 0.5 |

TABLE 1-continued

| | Cake | | Example 1 | | | | Comparative Example 1 | | | |
|---|---|---|---|---|---|---|---|---|---|---|
| Section used | Removed amount of strand (g) | Remaining amount of cake (g) | Yarn count (g/km) | Tensile strength (N) | Tensile strength/ yarn count | Number of blisters | Yarn count (g/km) | Tensile strength (N) | Tensile strength/ yarn count | Number of blisters |
| [5] | 3050 | 250 | 80.3 | 87.79 | 1.093 | 3.5 | 82.2 | 81.1 | 0.987 | 7 |
| [6] | 3080 | 220 | 79.4 | 84.14 | 1.06 | 3.5 | 81.1 | 80.64 | 0.994 | 4.5 |
| [7] | 3120 | 180 | 83 | 84.01 | 1.012 | 2 | 81.7 | 79.29 | 0.971 | 4 |

As shown in Table 1, it is evident that the twisted yarn in Example 1 using a single glass fiber strand without drawing a plurality of them together, in the impregnation process, has higher tensile strength as compared with the twisted yarn in Comparative Example 1 using three glass fiber strands drawn together. This is considered attributable to the fact that there is no problem of fluctuation in tension during drawing a plurality of glass fiber strands together. Further, it is evident that when in Example 1, the glass fiber strand of the inner or outer section of the cake is used, the number of blisters is small and the influence by migration is small. This is considered attributable to the fact that the impregnation of the RFL treating agent to glass filaments is improved.

Thus, according to the present invention, the impregnation degree of the RFL treating agent to the glass fiber strand will be good. Especially, even with a glass fiber strand at a section of the cake where it used to be difficult to impregnate the RFL treating agent because of a large amount of a sizing agent deposited unevenly, the impregnation degree of the RFL treating agent will be good.

Example 2

A cake of a glass fiber strand (600 glass filaments bundled) having a mass of 3,300 g was obtained in the same manner as in Example 1.

Further, the glass fiber strand was pulled out from a section wherein 200 g of the glass fiber strand was removed from the innermost section of such a cake by pulling the strand out (remaining amount of cake: about 3,100 g), and the strand was individually and continuously immersed into a bath filled with the RFL treating agent to have the RFL treating agent deposited and impregnated to the glass fiber strand.

After that, such a glass fiber strand was continuously heated for one minute in a hot air oven at a temperature of 250° C. to dry and solidify the RFL treating agent, to obtain a coated glass fiber having a coating layer (first membrane) made of the RFL treating agent.

Then, such a coated glass fiber was taken up by using a ring twisting machine as a winding machine. In such a manner, 500 m of 11 twisted yarns having a number of twists of 2 twists/25 mm were obtained. Here, the deposited amount of the above first membrane was 18 mass % as solid content based on the mass of the twisted yarn.

Further, while such 11 twisted yarns were drawn together, the plying was carried out in the opposite twisting direction from the twisting to have a number of twists of 2 twists/25 mm, by using a ring twisting machine different from the twisting process, to obtain a plied yarn. At that time, the weight of a traveler used by the ring twisting machine for plying, was properly chosen among commercially available ones, to adjust the relation of the yarn count and the cross section of an obtainable glass fiber for reinforcing rubber products to be in a range of the above formula (1).

Then, such a plied yarn was continuously immersed in a bath filled with the above over-coat treating agent, and the over-coat treating agent was deposited on the plied yarn. After that, such a plied yarn was continuously heated for one minute in a hot air oven at a temperature of 130° C. to dry and solidify the over-coat treating agent, to form a coating layer (second membrane) made of the over-coat treating agent, thereby to obtain a glass fiber for reinforcing rubber products of Example 2. Here, the deposited amount of the above second membrane was 4 mass % as solid content based on the mass of the glass fiber for reinforcing rubber products.

Example 3

By using the same ring twisting machine and conditions as in Example 2, except for using a traveler having a weight lighter by 28.6% than the one used in Example 2, a plied yarn was obtained by subjecting 11 twisted yarns obtained by the same method as in Example 2, to plying while drawing them together. At that time, by using the traveler lighter than the one used in Example 2, the relation of the yarn count and the cross section of an obtainable glass fiber for reinforcing rubber products became out of the range of the above formula (1) (less than the lower limit value).

Then, such a plied yarn was subjected to an over-coating process using the same treating agent and condition as in Example 2, to obtain the glass fiber for reinforcing rubber products of Example 3.

Comparative Example 2

Three cakes of glass fiber strands (200 glass filaments bundled, respectively) each having a mass of 3,300 g were obtained in the same manner as in Comparative Example 1. The glass fiber for reinforcing rubber products of Comparative Example 2 was obtained in the same manner as in Example 2, except that from the respective portions where 200 g each of the glass fiber strand was removed respectively from the innermost sections of such three cakes (remaining mount of each cake: 3,100 g), three glass fiber strands were pulled out and drawn together, and they were continuously immersed in a bath filled with the RFL treating agent to have the RFL treating agent deposited and impregnated to the glass fiber strands.

Test Example 2

With respect to the glass fiber for reinforcing rubber products obtained in each of the above Examples 2 and 3 and Comparative Example 2, the yarn count and the tensile strength were measured, and a value obtained by dividing the tensile strength by the yarn count was used as an index for the physical strength. Further, the tensile strength after boiling treatment was measured, and a ratio (a retention before and after boiling) between a tensile strength at an original state and a tensile strength after the boiling treatment was calculated and was used as an index for water resistance. Further, the cross section was calculated by measuring the diameter of the glass fiber for reinforcing rubber products, and the yarn count was divided by the cross section, to obtain the relation between the cross section and the yarn count. The results are shown in Table 2.

Method for Measuring Tensile Strength at Original State

Using a tensile tester, the measurement of stress at break was carried out under such conditions that the chuck distance was 250 mm, and the tensile speed was 250 mm/min.

Method for Measuring Tensile Strength after Boiling Treatment

The glass fiber for reinforcing rubber products was immersed in boiling deionized water for one hour, and then, it was immersed in deionized water at room temperature for five minutes to be cooled down. Water deposited on the surface of the glass fiber for reinforcing rubber products was lightly wiped off, and then, by using a tensile tester, the measurement of the stress at break was carried out under such conditions that the chuck distance was 250 mm, and the tensile speed was 250 mm/min.

Method for Measuring Diameter

By using a constant pressure thickness tester, four glass fibers for reinforcing rubber products lined up in parallel without any space, were pressurized with a pressure of 226 g/cm$^2$ for five seconds, and the thickness was measured as four of them lined. It was referred to as a diameter.

TABLE 2

|  | Ex. 2 | Ex. 3 | Comp. Ex. 2 |
|---|---|---|---|
| Yarn count (g/km) | 947 | 950 | 953 |
| Tensile strength at original state (N) | 1024 | 1010 | 988 |
| Tensile strength/yarn count | 1.081 | 1.063 | 1.037 |
| Tensile strength after boiling (N) | 967 | 915 | 935 |
| Retention before and after boiling (%) | 94.4 | 90.6 | 94.6 |
| Diameter (mm) | 0.86 | 0.92 | 0.85 |
| Yarn count/cross section | 1630 | 1429 | 1679 |

As shown in Table 2, Examples 2 and 3 have higher tensile strengths as compared with Comparative Example 2. It is considered that, in Examples, the impregnation degree of the RFL treating agent to the glass fiber strand is good, and there is no fluctuation in tension during drawing a plurality of glass fiber strands together, like in the conventional technique.

Further, it is evident that Example 2 wherein the relation of the yarn count and the cross section of the glass fiber for reinforcing rubber products, satisfies the above formula (1), is better in water resistance than Example 3 which does not satisfy the relation of the above formula (1). It is considered that the cohesion among twisted yarns constituting the glass fiber for reinforcing rubber products of Example 2 becomes higher, and penetration of water to inside of the fiber is prevented.

INDUSTRIAL APPLICABILITY

The reinforcing glass fiber of the present invention may be suitably used as a reinforcing material for various rubber products such as rubber tires or rubber belts including timing belts.

The entire disclosure of Japanese Patent Application No. 2005-358718 filed on Dec. 13, 2005 including specification, claims and summary is incorporated herein by reference in its entirety.

The invention claimed is:

1. A glass fiber for reinforcing rubber products, which is obtained by subjecting to plying at least two twisted yarns each obtained by subjecting to twisting a coated glass fiber strand having a first coating layer formed by impregnation and solidification of a RFL treating agent comprising a rubber latex and a water-soluble condensate of resorcinol with formaldehyde, the coated glass fiber strand having the first coating layer formed by impregnating the RFL treating agent to an individual glass fiber strand having from 200 to 2,000 bundled glass filaments, and solidifying the impregnated agent of the individual glass fiber strands, wherein drawing the individual glass fiber strands together prior to impregnating is omitted.

2. The glass fiber for reinforcing rubber products according to claim 1, wherein a second coating layer made of a treating agent comprising a rubber and a solvent, is further formed on a surface of the glass fiber obtained by plying.

3. The glass fiber for reinforcing rubber products according to claim 1, wherein the glass fiber strand comprises from 500 to 1,500 bundled glass filaments.

4. The glass fiber for reinforcing rubber products according to claim 1, wherein a yarn count (g/km) and a cross section (mm$^2$) satisfy the relation of the following formula (1):

$$1450 \leq \text{yarn count (g/km)/cross section (mm}^2) \leq 1900 \quad (1).$$

5. The glass fiber for reinforcing rubber products according to claim 4, wherein the yarn count (g/km) and the cross section (mm$^2$) satisfy the relation of the following formula (2):

$$1550 \leq \text{yarn count (g/km)/cross section (mm}^2) \leq 1800 \quad (2).$$

6. A method for producing a glass fiber for reinforcing rubber products, the method comprising:
    an impregnation process of impregnating a RFL treating agent comprising a rubber latex and a water-soluble condensate of resorcinol with formaldehyde, to an individual glass fiber strand, and solidifying the RFL treating agent impregnated to the individual glass fiber strand to form a first coating layer, thereby to obtain a coated glass fiber strand,
    a twisting process of subjecting the coated glass fiber strand to twisting to obtain a twisted yarn, and
    a plying process of putting together and subjecting to plying at least two twisted yarns,
    wherein the glass fiber strand comprises from 200 to 2,000 bundled glass filaments, and the RFL treating agent is impregnated to each individual glass fiber strand independently without drawing the individual glass fiber strands together prior to the impregnation process.

7. The method for producing the glass fiber for reinforcing rubber products according to claim 6, further including:
   an over-coating process of applying a treating agent containing a rubber and a solvent to a surface of a plied yarn obtained by the plying process, and solidifying the treating agent applied to the plied yarn to form a second coating layer.

8. The method for producing a glass fiber for reinforcing rubber products according to claim 6, wherein as the glass fiber strand comprises from 500 to 1,500 bundled glass filaments.

* * * * *